(12) United States Patent
Chen et al.

(10) Patent No.: US 9,268,815 B2
(45) Date of Patent: Feb. 23, 2016

(54) MAP-REDUCE AND PARALLEL PROCESSING IN DATABASES

(75) Inventors: Qiming Chen, Cupertino, CA (US); Bin Zhang, Fremont, CA (US); Ren Wu, San Jose, CA (US); Andy Therber, Columbus, IN (US); Meichun Hsu, Los Altos, CA (US); Hans Zeller, Los Altos, CA (US); David Birdsall, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1174 days.

(21) Appl. No.: 12/544,227

(22) Filed: Aug. 20, 2009

(65) Prior Publication Data

US 2011/0047172 A1 Feb. 24, 2011

(51) Int. Cl.
*G06F 17/30* (2006.01)

(52) U.S. Cl.
CPC .............................. *G06F 17/30445* (2013.01)

(58) Field of Classification Search
USPC .......... 707/713, 736, 737, E17.014, E17.017, 707/E17.032, E17.046, E17.089, 999.002, 707/999.003, 999.01
See application file for complete search history.

(56) References Cited

U.S. PATENT DOCUMENTS

| | | | |
|---|---|---|---|
| 6,594,651 B2 * | 7/2003 | Kabra et al. | |
| 2005/0055384 A1 * | 3/2005 | Ganesh et al. | 707/202 |
| 2005/0251796 A1 * | 11/2005 | Poelman et al. | 717/163 |
| 2006/0242136 A1 * | 10/2006 | Hammond et al. | 707/4 |
| 2008/0046473 A1 * | 2/2008 | Miao et al. | 707/200 |
| 2009/0077011 A1 * | 3/2009 | Natarajan et al. | 707/2 |
| 2009/0248624 A1 * | 10/2009 | Lammel et al. | 707/3 |
| 2010/0312769 A1 * | 12/2010 | Bailey et al. | 707/740 |
| 2011/0029551 A1 * | 2/2011 | Chen et al. | 707/759 |

OTHER PUBLICATIONS

"Data-Continuous SQL Process Model", by Chen, Quiming and Hsu, Meichu, Lecture Notes in Computer Science, 2008, vol. 5331/2008, pp. 175-192, DOI: 10.1007/978-3-540-88871-0_14.*

"MapReduce: Simplified Data Processing on Large Clusters", by Dean, Jeffrey and Ghemawat, Sanjay, Communications of the ACM Jan. 2008 vol. 51 No. 1, p. 107, DOI: 10.1145/1327452.1327492.*

"A Denotational Semantics for Continuous Queries over Streams and Relations" by Arasu, 2004.*

A Denotational Semantics for Continuous Queries over Streams and Relations, Arvind Arasu, SIGMOD Record, vol. 33, No. 3, Sep. 2004.*

"A Denotational Semantics for Continuous Queries over Streams and Relations" to Arasu et al., SIGMOD Record vol. 33, No. 3, Sep. 2004.*

* cited by examiner

*Primary Examiner* — James Trujillo
*Assistant Examiner* — Miranda Huang
(74) *Attorney, Agent, or Firm* — Hewlett Packard Enterprise Patent Department

(57) ABSTRACT

One embodiment is a method that uses MapReduce and Relation Valued Functions (RVFs) with parallel processing to search a database and obtain search results.

11 Claims, 7 Drawing Sheets

MAP-REDUCE AND PARALLEL PROCESSING IN DATABASES

BACKGROUND

Databases are electronic filing systems that store records or data in a computer system. Computer programs or users can send and retrieve data from the database using a database management system (DBMS).

The amount of data stored in database systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

DETAILED DESCRIPTION

Figure 1:
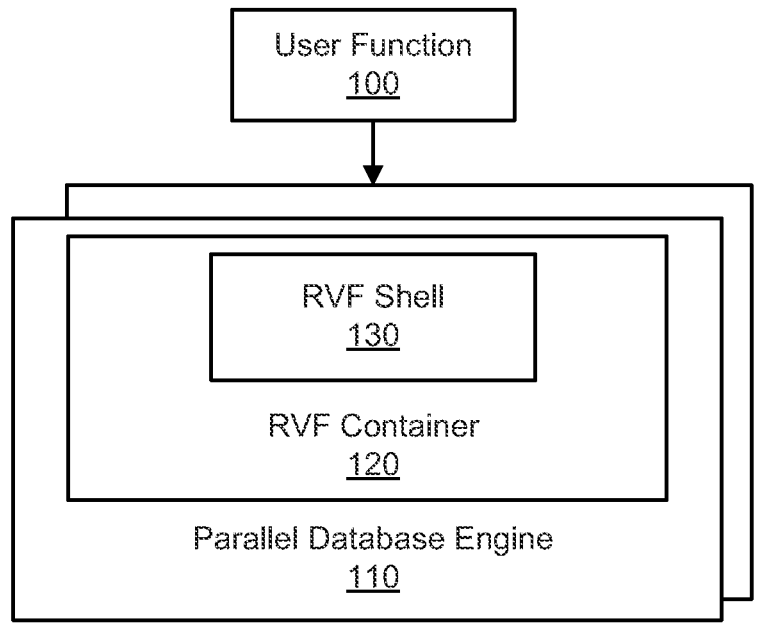
FIG. 1 shows user functions input into parallel database engines in accordance with an exemplary embodiment.

Exemplary embodiments in accordance with the invention include apparatus, systems, and methods for performing MapReduce computations in a parallel database management system (DBMS).

While parallel DBMSs do support large scale parallel query processing on partitioned data using MapReduce, the reach of more general applications relies on User Defined Functions (UDFs). The existent UDF technology, however, is insufficient both conceptually and practically. For example, a UDF is not a relation-in, relation-out operator. This limitation restricts the ability of a UDF for modeling complex applications defined on a set of tuples rather than on a single tuple and for being composed with other relational operators in a query. Further, to interact with the query execution efficiently, a UDF is coded with DBMS internal data structures and system calls that are generally beyond the expertise of an analytics user.

To solve these limitations, embodiments in accordance with the invention wrap general applications by Relation Valued Functions (RVFs). Then, based on the notion of invocation patterns, exemplary embodiments provide focused system support for efficiently integrating RVF execution into a query processing pipeline. Exemplary embodiments further distinguish the system responsibility and the user responsibility in RVF development by separating an RVF into the RVF-Shell for dealing with system interaction, and the user-function for pure application logic. The RVF-Shell is constructed in terms of high-level Application Program Interfaces (APIs) or even generated automatically, and the RVF is made by plugging the user-function in the RVF-shell. These mechanisms enable exemplary embodiments to solve limitations in supporting MapReduce and other analytics computation modes inside a parallel database engine: modeling complex applications, integrating them into query processing, and liberating analytics users from DBMS internal details.

In order to assist in a further discussion of exemplary embodiments in accordance with the invention (i.e., exemplary embodiments), the description is divided with headings at various sections.

Overview

MapReduce provides distributed processing of map and reduction operations in parallel data computations. The map and reduce functions are defined with respect to data structured in (key, value) pairs. Map takes one pair of data with a type on a data domain and returns a list of pairs in a different domain:

$$\text{map: } (k1, v1) \Rightarrow \text{list}(k2, v2).$$

The map function is applied in parallel to each item in the input dataset. This function produces a list of (k2, v2) pairs for each call. These pairs are collected with the same key from all lists and grouped together to create one group for each one of the different generated keys.

The reduce function is applied in parallel to each group and produces a collection of values in the same domain as follows:

$$\text{Reduce: } (k2, \text{list}(v2)) \Rightarrow \text{list}(v3).$$

The MapReduce framework thus transforms a list of (key, value) pairs into a list of values. By way of example, a MapReduce infrastructure takes two computation functions:

$$\text{map: } (k, v) \Rightarrow (k', v')^* \quad \text{reduce: } (k', v') \Rightarrow (k'', v'')^*$$

and executes these functions in parallel (for example, using multiple computers in a distributed computer or storage system). Here, the map method is applied to a set of key-value tuples (k, v) and transforms each tuple into a set of tuples of a different type (k', v'), while the reduce method aggregates the set of values v' with the same k'. The reduce function can produce zero or more key value pairs that can differ in both the key and the value. The map method is executed in parallel, and a partition function for k', typically a simple hash of the key, is specified to allow reduce operations for different k' to be parallelized.

With MapReduce, the user provides a map function and a reduce function. The system interaction and parallel execution are handled by the platform.

Exemplary embodiments use MapReduce with SQL and query engines in a parallel database system. The use of parallel SQL engines provides integrated schema management, declarative query language, rich optimization, and adaptive workload management, which are missing from the file system based MapReduce platforms. The combination of parallel database engine and MapReduce enriches MapReduce through schema management and optimization and expands the reach of the MapReduce to sophisticated data management, as well as the reach of parallel database engines to general analytics computation.

By utilizing MapReduce computation models inside a database engine, UDF technology is extended in exemplary embodiments. Some examples are provided below.

As one example, exemplary embodiments support Relation Valued Functions (RVFs) at SQL language levels to allow a function, either for map, reduce or other computation, to receive tuple-set arguments and to return a tuple-set. This enables exemplary embodiments to carry out more complex computations defined on the entire input relations and to serve as a relational data source in the query processing pipeline.

As another example, exemplary embodiments allow RVF "patterns" to be explicitly declared for focused system support. An RVF is invoked within a query; like other relational operators, it may be called once for returning an entire tuple-set, or called multiple times, one for each returned tuple. During execution, an RVF interacts with the query executor in several aspects for resolving arguments, caching initial data to be used in multiple calls, managing memory life span, etc. An RVF pattern represents a specific style for applying the RVF to its input relations, such as to one tuple at a time, to an entire relation, or to multiple input relations in a hybrid way. Multiple RVF invocation patterns are used for interacting with various applications with the query processing properly.

As another example, exemplary embodiments generate an RVF shell. We divide an RVF into two parts: RVF shell and user-function, Here, the RVF shell deals with the interaction with query processing in parameter passing, data conversion, initial data preparation, memory management, etc.; and the user-function deals with application logic only. The RVF is made by plugging the user function in the shell. To shade the DBMS internal details from RVF developers, a set of high-level RVF Shell APIs are developed; and the Simple Relation. Object Mapping (SROM) protocol is introduced for the conversion of relation data between their system internal format and the counterpart C-structures or C++ objects used in coding the application logic. One step further, we automate the generation of RVF shells from their declarations, argument relation schemas, etc. These approaches liberate analytics users from DBMS internal details and make the UDF technology accessible to them.

FIG. 1 shows a solution stack that includes user functions 100 (such as map, reduce, etc.) input into parallel database engines 110 having an RVF container 120 and RVF shell 130.

The RVF container 120 extends from a query engine and interacts with a query executor to support execution of the contained RVF. Header files holding relation object typedefs are generated from corresponding schemas, UDTs (user defined types) and the SROM. These typedefs are used by the "user-function" and are much simpler than their DBMS-internal formats. An RVF shell is constructed using higher level APIs, and the construction is made automatic based on RVF's declaration, invocation mode, and the above data conversion. In this way, the RVF developer can concentrate to the plug-in user-function which is free of DBMS internal data structures and system calls. These mechanisms enable exemplary embodiments to solve problems in supporting MapReduce and other analytics computation modes inside a parallel database engine: modeling complex applications, integrating them into query processing, and liberating analytics users from DBMS internal details.

Parallel Database Versus MapReduce

This section discusses how K-Means clustering is expressed in SQL with UDFs in a MapReduce style running on a parallel database system. This section also discusses a performance problem using conventional scalar UDFs.

Figure 2:
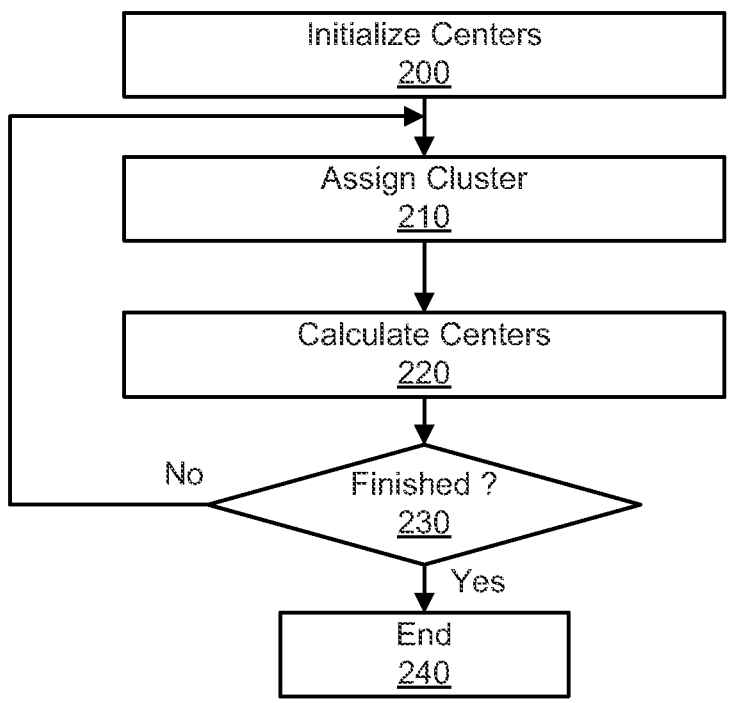
FIG. 2 shows an algorithm to cluster objects in accordance with an exemplary embodiment.

FIG. 2 illustrates an algorithm to cluster n objects based on attributes into k partitions, k<n. The algorithm attempts to find centers of natural clusters in data.

According to block 200, the centers are initialized, and assignments to the centers are performed at block 210. The centers are calculated at block 220. If the calculations finish per block 230, then flow ends at 240; otherwise flow proceeds back to block 210.

The algorithm assumes that the object attributes form a vector space. One objective is to minimize total intra-cluster variance, or, the squared error function:

$$V = \sum_{i=1}^{k} \sum_{p_j \in C_j} (p_j - \mu_i)^2.$$

In this equation, there are k clusters $C_i$, i=1, 2, ..., k; and $\mu_i$ is the center or mean point of all the points $p_j \in C_i$. Let us consider the SQL expression of K-Means for two dimension geographic points. In a single iteration, the first phase is for each point in relation Points [x, y, ... ]

to compute its distances to all centers in relation

Centers [cid, x, y, ... ], and assign its membership to the closest one, resulting a relation Nearest_centers [x, y, cid].

The second phase is to re-compute the set of new centers based on the average location of member points. In SQL with a scalar UDF, these two steps can be expressed as follows:

[Query 0: using conventional scalar UDF]

SELECT Cid, avg(X) AS cx, avg(Y) AS cy FROM
 (SELECT P.x AS X, P.y AS Y, (SELECT cid FROM Centers C WHERE
  dist(P.x,P.y,C.x,C.y) = (SELECT MIN(dist(P2.x,P2.y,C2.x,C2.y))
  FROM Centers C2, Points P2 WHERE P2.x=P.x AND P2.y=
P.y)
 ) AS Cid FROM Points P)
GROUP BY Cid.

Figure 3:
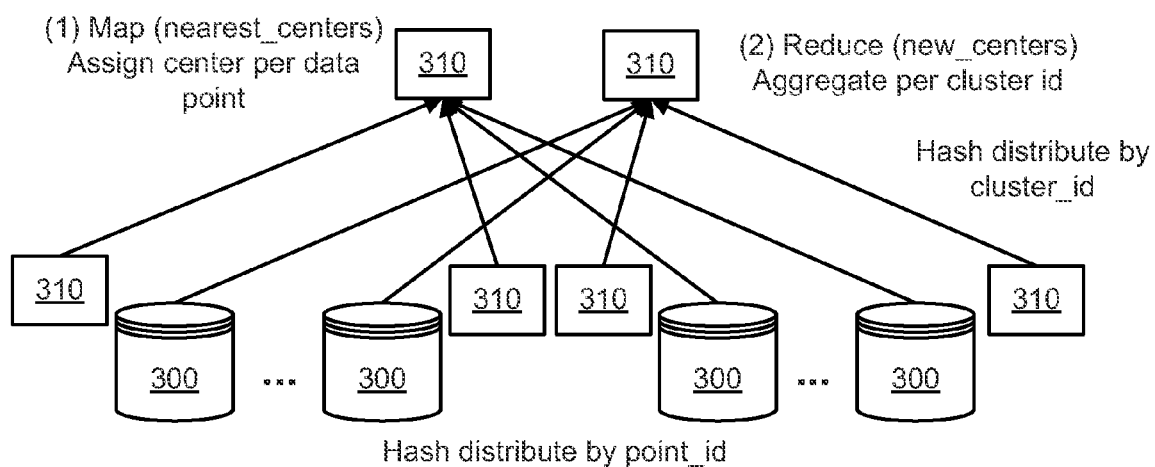
FIG. 3 shows a query executing on a parallel database and following a MapReduce computation model in accordance with an exemplary embodiment.

Executed on a parallel database, the above query follows a MapReduce computation model as shown in FIG. 3. It starts with storage devices 300 (such as databases) having a set of cluster centers 310 and executes in a map-reduce style. First with regard to mapping, the model finds the nearest_centers corresponding to a map function. This map function takes every point in the set and identifies a center the point is closest to based on some distance function (not necessarily Euclidian), and assigns the point to that cluster. Second with regard to reduction, the model computes new centers, which corresponds to a reduce function, which finds, for every cluster, the geometric mean of all the points assigned to that cluster to be its new center.

To draw an analogy to SQL, map is like the clause for generating Nearest_centers [x, y, cid], and reduce is analogous to the aggregate function (e.g., average) that is computed over all the rows with the same group-by attribute. On a parallel database, the Points table is hash partitioned by point_id over multiple server nodes; and the map function for assigning the nearest centers is applied to each data partition in parallel, each yields a local portion of result-set, which is automatically re-partitioned by center_id (cid) for the parallel reduce computation in the aggregation/group-by phase.

Current UDF technology has limitations for data intensive computations, such as performance in interacting to query executor and availability for users to handle. Consider an example of a plan query with the nearest center for each point computed for all the centers. Since this query uses scalar UDF/expression evaluated on the per-tuple basis, and the UDF is unable to receive the whole centers relation as an input argument, then (1) the centers relation is not cached but retrieved for each point, and (2) the centers relation is also retrieved in a nested query (Query Optimizer turns it to join) for each point p, for the minimum distance from p to centers.

In addition to repeated relation data retrieval, some applications cannot be modeled without the presence of whole relations (such as minimal spanning tree computation). Further, feeding in a UDF a set of tuples rather than a single one is the bottom-line for data-parallel computation using multi-cores or GPUs. All these have motivated us to support Relation Valued Functions (RVFs) as explained in the next sections.

RVF and RVF Invocation Pattern

The conventional scalar, aggregate and table UDFs are unable to express relational transformations and to be composed with other relational operators in a query since either their inputs or outputs are not relations. The tuple-wise input also incurs modeling insufficiency or execution inefficiency. In order to overcome these limitations, we introduced Relation Valued Functions (RVFs) at the SQL language level. RVFs are the kind of UDFs with relation input and output, they can be used to: (1) model complex applications defined on entire relations; (2) be composed with other relational operators in the relation-in, relation-out query processing pipeline; (3) avoid loading static relations repeatedly; and (4) open the opportunities for in-function batch and parallel processing (e.g. using multi-cores or GPUs).

Exemplary embodiments use RVFs coded in non-SQL language, such as C, to support data-intensive analytics inside a database engine. An RVF is defined as follows:

DEFINE RVF f ($R_1$, $R_2$, k) RETURN $R_3$ {
    Relation $R_1$ (/*schema*/);
    Relation $R_2$ (/*schema*/);
    int k;
    Relation $R_3$ (/*schema*/);
    PROCEDURE fn(/*dll name*/);
    RETURN MODE SET_MODE;
    INVOCATION PATTERN BLOCK
} where the relation schemas $R_1$, $R_2$ and $R_3$ denote the "schema" of f, in the sense that the actual relation instances or query results compliant to those schemas are bound to f as actual parameters.

An RVF has at least one input relation, or tuple-set returned from a query. Furthermore, the RVF cannot update its input relations but can generate a new relation as its output, and in this way viewed as a relational operator or data source. RVFs can be naturally composed with other relational operators or sub-queries in a SQL query; its own relational arguments can be expressed by queries as well, such as shown below:

SELECT * FROM $RVF_1(RVF_2(Q_1,Q_2),Q_3)$.

Figure 4:
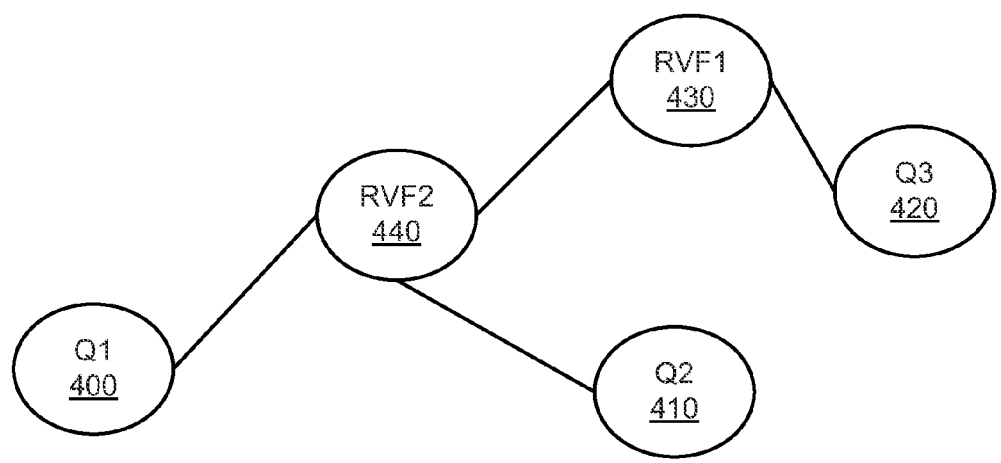
FIG. 4 shows RVFs as relational operators in accordance with an exemplary embodiment.

This concept is illustrated in FIG. 4 which shows RVF1 (430) and RVF2 (440) as relational operators with $Q_1$ (400), $Q_2$ (410), and $Q_3$ (420) as queries.

In exemplary embodiments, an RVF is an extension at the SQL level which is supported by extending the query processor, rather than by ad-hoc user programs. For example, a single iteration of K-Means clustering is expressed in FIG. 5 and includes representations for points 500, $\pi_{x,y}$ 510, nearest_center_rvf1 520, centers 530, $\pi$ 540, Avg-groupby 550, and $\pi$ 560. The clustering is expressed by the following query with an RVF, nearest_center_rvf1, that receives two input relations:

[Query 1: RVF with block input and output]

SELECT r.cid, avg(r.x), avg(r.y) FROM nearest_center_rvf1 (
    "SELECT x,y FROM Points", "SELECT x,y,cid FROM Centers") r
    GROUP BY r.cid.

Figure 5:
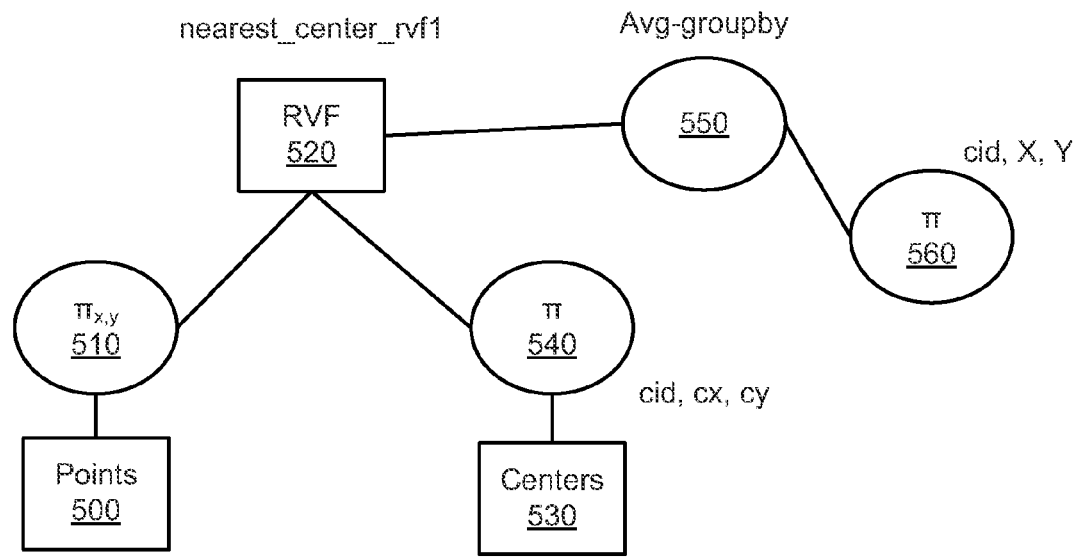
FIG. 5 shows K-means by RVF with inputs as whole relations in accordance with an exemplary embodiment.

An RVF receives an input relation as a whole; in this case that relation is declared as static (by default) and cached in as initial data during execution. If all the input relations are static then the RVF is a block operation, such as shown in FIG. 5.

During query processing, the argument of a relation operator is fed in tuple-by-tuple (e.g. at the probe site of hash-join), or as a set of tuples (e.g. at the build-site of hash-join). If an operator has one tuple-wise input, it is called multiple times wrt to that input during execution. In this way, a query is evaluated tuple-by-tuple in the pipelined fashion where a parent operator requests its child operator to return "next" tuple, and recursively the child operator requests its own child operator to return "next" tuple, . . . in the top-down demand driven and bottom-up dataflow fashion. How to deal with input/output relation data represents the invocation patterns.

The analogy between RVFs and relational operators allows them to be invoked compositionally in a query and allows the notion of invocation patterns to be applied to RVFs.

Figure 6:
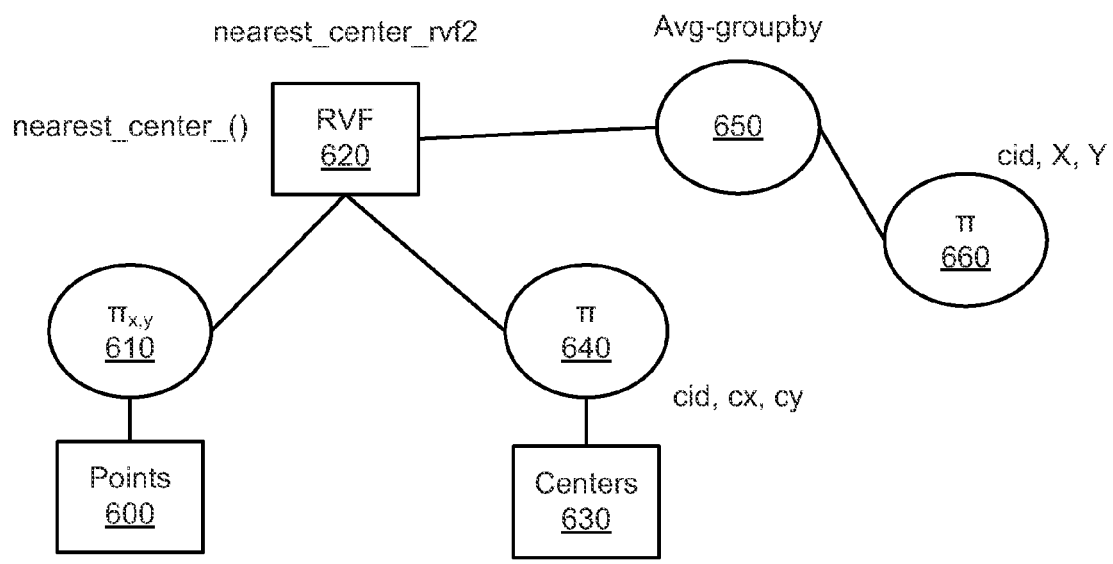
FIG. 6 shows K-means by RVF with points feed-in tuple-by-tuple and centers as a whole in accordance with an exemplary embodiment.

An RVF pattern represents a specific mechanism for applying the RVF to its input/output relations. The simplest pattern, PerTuple, can be defined such that applying PerTuple to RVF f with a single input relation R means f is to be invoked for every tuple in R (pipelined). Under the Block pattern, as shown by Query 1 in FIG. 5, the RVF, nearest_center_rvf1, is called only once in processing a query, with both relations, Points and Centers, are cached in. The block pattern underlies "in-RVF data parallel computation"; however, when the input relation is sizable, this invocation mode is inappropriate as it may run out memory. In that case, a more complex pattern, CartProdProbe (Cartesian product probe), is used. Applying this pattern to RVF f with 2 input relations $R_{left}$ and $R_{right}$, means that f is to be invoked for every combination of tuples in $R_{left}$ and $R_{right}$, where $R_{left}$ is invoked tuple-by-tuple (pipelined), and $R_{right}$ is small enough that one can assume that a data structure representing all tuples in $R_{right}$ can reside in memory. In our K-means RVF examples, we have specified the invocation pattern of RVF nearest_center_rvf2 as CartProdProbe. FIG. 6 shows it is executed point by point, but wrt all centers. This figure includes representations for points 600, $\pi_{x,y}$ 610, nearest_center_rvf2 620, centers 630, $\pi$ 640, Avg-groupby 650, and $\pi$ 660.

[Query 2: RVF with CartProdProbe invocation pattern]

SELECT Cid, avg(X) AS cx, avg(Y) AS cy FROM
    (SELECT p.x AS X, p.y AS Y,
    nearest_center_rvf2 (p.x, p.y, "SELECT cid, x, y FROM Centers")
    AS Cid FROM Points p)
    GROUP BY cid.

RVF patterns are a generalization of the limited forms of declarations existent today on some implementation of user-defined aggregate functions. Exemplary embodiments, however, define richer patterns to provide benefits in optimized data flow and focused system support.

Figure 7:
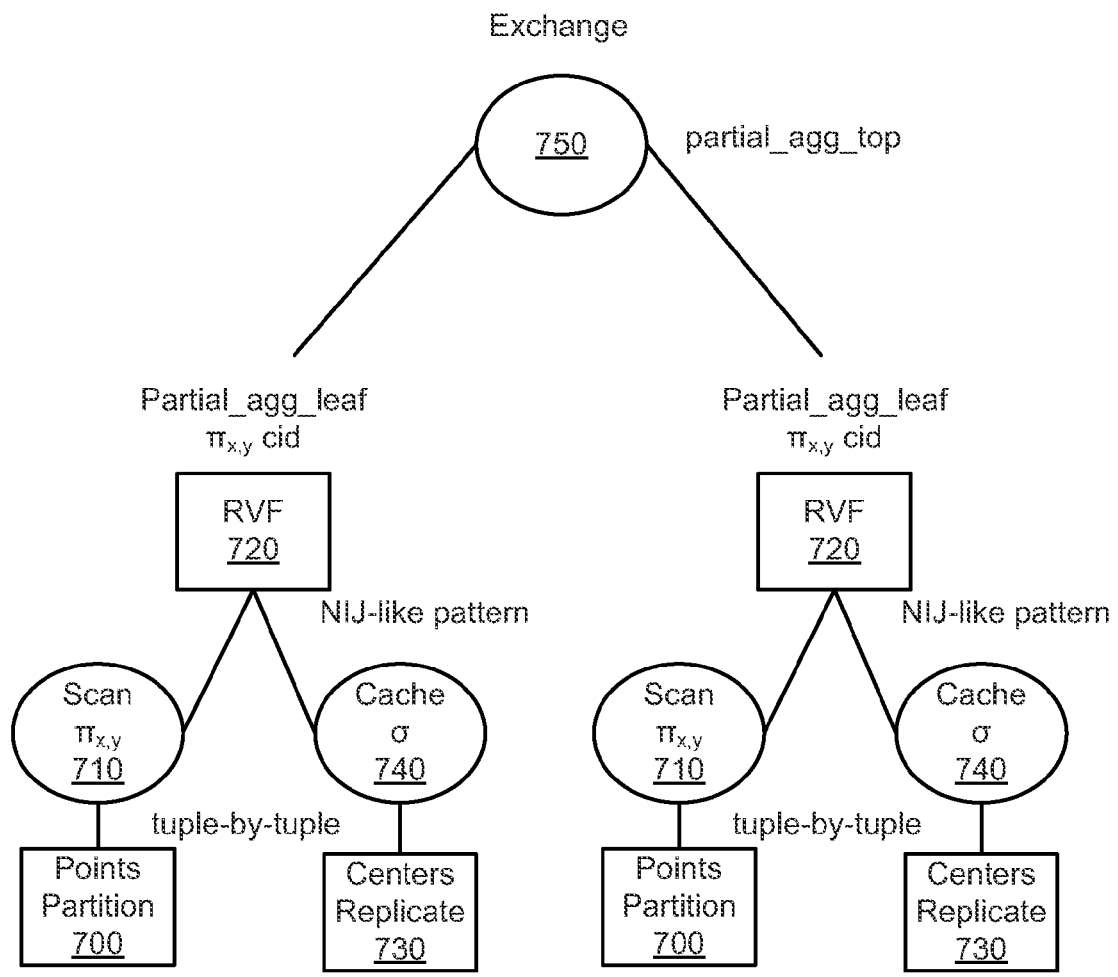
FIG. 7 shows a query with CartProdProbe RVF parallelized by a database engine in accordance with an exemplary embodiment.

FIG. 7 shows a query with CartProdProbe RVF parallelized by a database engine shown with points partition 700, scan 710, RVF 720, centers 730, cache 740, and Exchange 750. The Exchange 750 serves as a point of redistribution for the query plan. For example, the Exchange can combine parallel streams from different processes into one process, or the Exchange can redistribute date from M producer processes to N consumer processes. In this figure, Points data are hash partitioned, and Centers are replicated to multiple nodes to be parallel processed by the RVF for finding nearest centers (Map); new centers are computed by groupby-aggregate (Reduce); re-partitioning Map results are handled by the database engine. In one exemplary embodiment, all of the above operations are automatic.

Regarding to MapReduce, we already see the analogy of reduce and groupby-aggregate. In fact, arbitrary reduce function in one exemplary embodiment are coded as an RVF. MapReduce is the parallel execution of the AggrPartion super-pattern for invoking two RVFs $f_{map}$ and $f_{reduce}$, where $f_{map}$ is the data source of $f_{reduce}$ where $f_{map}$ return s map mresults tuple by tuple, and $f_{reduce}$ takes the results of $f_{map}$, materialized as a set of accumulators, and provides global aggregation. This can be seen in the following Query 3 (FIG. 8) for calculating new centers in a single iteration of K-Means:

---

[Query 3: AggrPartition super-pattern for $f_{map}$ and $f_{reduce}$].

SELECT cid, x, y FROM Reduce (Map (Points, Centers)).

---

Figure 8:
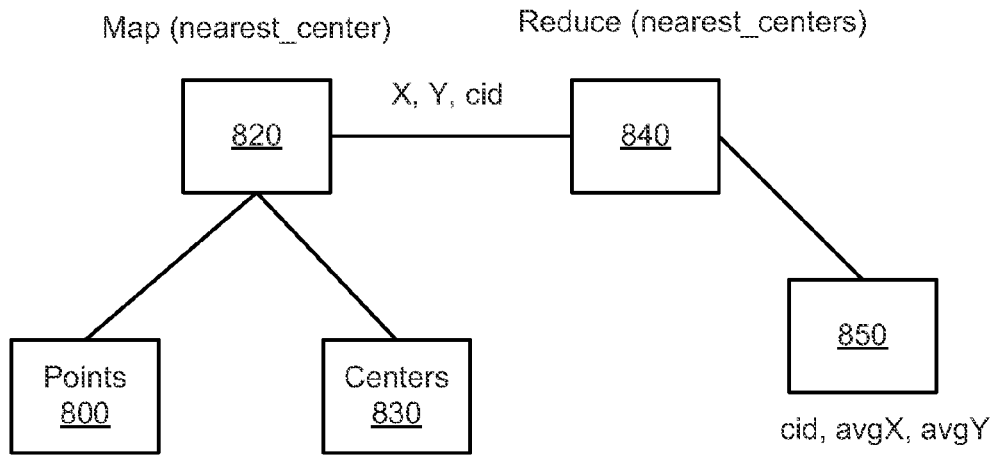
FIG. 8 provides a K-means by Map RVF and Reduce RVF in accordance with an exemplary embodiment.

FIG. 8 includes points 800, Map (nearest_center) 820, Centers 830, Reduce (nearest_centers) 840, and cid, avgX, avgY 850. In the figure, classifying RVF invocations to designated patterns underlies focused and pattern-specific system support for interacting their executions with the query processing efficiently. With well-understood RVF invocation characteristics, it is possible to provide high-level APIs to shade DBMS internal details from users and automatically generate system code to ease RVF development.

Function Invocation

From application point of view, the core of an RVF is the application logic; however, in order for the RVF to be executable in the query processing environment, certain system support is used. In one exemplary embodiment, an RVF container provides pattern specific system support for running the contained RVFs falling to that pattern.

RVFs, or generally UDFs, are functions invoked during query processing. Before going to more details, more information is provided on how functions are executed in query processing (for example, multi-calls, memory context, argument passing, argument conversion, and return mode).

Multi-calls: Like other relational operators, a function executed in a query can be called multiple times, one for each returned tuple. The initial data used for every call and the carry-on data across calls are handled by the query executor through a function manager. To fit in the above running environment, a function is usually coded with three cases: FIRST_CALL, NORMAL_CALL and LAST_CALL (also referred to as INIT_CALL, NEXT_CALL and FINAL_CALL). The FIRST_CALL is executed only once in the first time the UDF is called in the hosting query which provides initial data; the NORMAL_CALL is executed in each call including the first call, for doing the designated application. Therefore there are multiple NORMAL_CALLs if the UDF is called one tuple at a time, or only a single NORMAL_CALL if the UDF is called only once. LAST_CALL is made after the last normal call for cleanup purpose. The query executor keeps track the number of calls of the UDF during processing a query, and checks the end-of-data condition for determining these cases.

Memory context: Accordingly, memory spaces allocated for function execution can have different life-spans: e.g. per-query with one call, multi-calls, per-call, etc. When a function interacts with the query executor, switching memory context is often necessary.

Argument passing: Each actual input argument is instantiated. For example, if the argument is an expression then it is evaluated. Dynamic arguments are per-call evaluated at the function argument-evaluation phase; static arguments are instantiated or evaluated only once in the FIRST_CALL. In RVF execution, when an argument stands for a relation but expressed by its name or by a query statement, the corresponding static relation instance (not per-tuple input) is retrieved in the FIRST_CALL only once.

Argument conversion: The basic data in query processing are sets of tuples. In general, the query engine internal data structure for tuples and the one defined for "user-function" (application code) are different (the latter should be much simpler), and the conversion between the two is necessary.

Return mode: Conceptually an RVF return a relation, or tuple-set. There are currently two return modes: TUPLE_MODE for returning one tuple-per-call in multiple calls, once for each input tuple, and SET_MODE for returning the entire tuple-set in a single call. With the TUPLE_MODE, there exist multiple NORMAL_CALLs, each generates one output tuple; with the SET_MODE, a single NORMAL_CALL generates the entire output relation. The resulting tuples are kept in a tuple-store before returning.

Simple Relation-Object Mapping (SROM)

A common functionality provided by RVF shells is to convert DBMS internal data structures for relation objects into simplified data structures to be manipulated in "user-functions". This is opposite to converting system internal data into string arguments as supported by some DBMSs, which can only deal with simple data and often sacrifices performance.

However, coding such conversion in terms of DBMS "system programs" requires the familiarity of system internal details which is in general beyond the expertise of analytical users. To free the RVF development from such burden, we defined the mappings from a relation schema to the data structures of the corresponding tuple (as C-struct) and tuple-set (as array of such C-structs). Object-relational mapping (ORM) converts data between incompatible type systems in relational databases and object-oriented programming languages to create a virtual object database. We use a language specific simple relation-object mapping protocol (SROM) to underlie the above data mapping.

Figure 9:
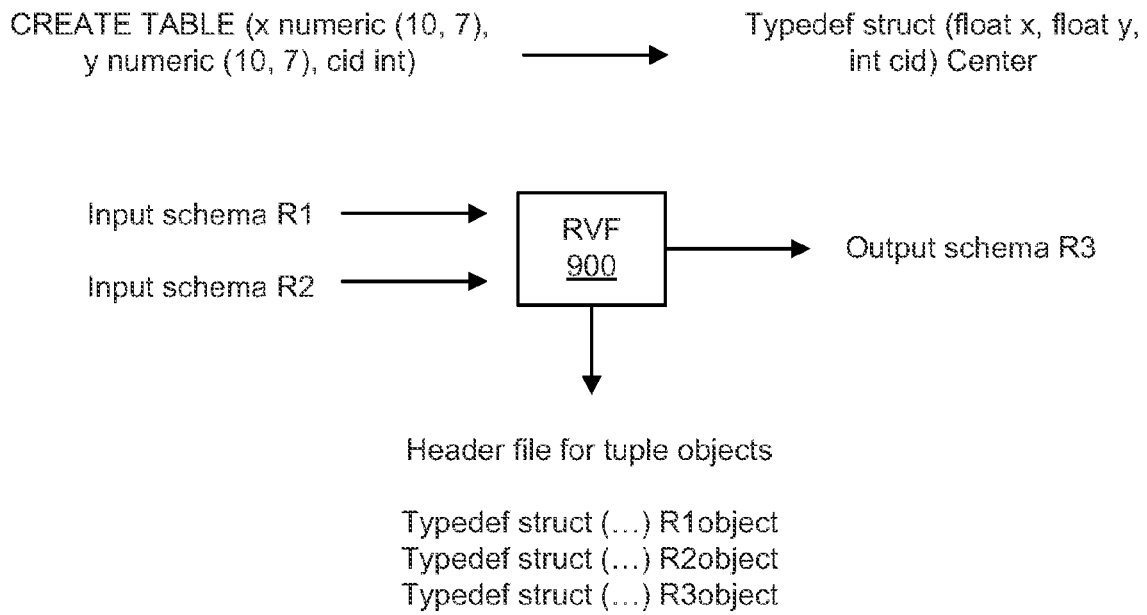
FIG. 9 shows header files generated based on SROM in accordance with an exemplary embodiment.

As shown in FIG. 9, the SROM for C is used to generate C typedefs in a header file based on the given relation schema and the correspondence between SQL types and C-types. User Defined Types (UDTs) with basic components are also covered. Input (schema R1 and R2) are input to RVF 900 and output schema R3 and header file for tuple objects as shown.

RVF Declaration and Registration

When an RVF is defined, the following information is given:
  (1) name;
  (2) arguments: where a scalar argument is specified by a name-type pair and a relation argument (including the return relation) is further specified by its schema; an argument may be static (initiated for, possibly, multi-calls) or dynamic (resolved in each call); by default, a relation argument is static;

(3) return mode: TUPLE_MODE or SET_MODE.

(4) invocation pattern: e.g. Block, CartProdProb, etc.

For example, the RVF for calculating nearest center, RVF nearest_center_rvf1, is defined in the following way:

```
DEFINE RVF nearest_center_rvf1 (Points, Centers)
  RETURN nearest_centers {
    RELATION Points (/* schema */),
    RELATION Centers (/* schema */),
    RELATION Nearest_centers (/* schema */),
    PROCEDURE nearest_center_shell,
    RETURN MODE SET_MODE),
    INVOCATION PATTERN Block
}
```

The container facility registers the pattern type, name, dll entry-point, etc., of RVF nearest_center_rvf2 into the FUNCTIONS meta table; and registers the order, I/O, name and type of each parameter into the FUNCTION_PARAM metatable.

These tables are to be retrieved by the RVF shell generation programs. By default relation "Centers" is static.

RVF Invocation

When the RVF is invoked, several handle data structures are provided by sub-classing the corresponding ones in query executor, which can be outlined abstractly as below.

Handle of RVF Execution (hFE) keeps track, at a minimum, the information about input/output relation arguments: schema, values (as C array), return mode, result set, etc.

Handle of RVF Invocation Context (hFIC) is used to control the execution of the RVF across calls. hFIC has a pointer to the hFE, and at a minimum keeps track the information on number of calls, end-of-data status, etc. A pointer to user-provided context is known as scratchpad for retaining certain application data between calls, memory context (e.g. life span one or multi-calls). hFIC has a pointer to hARG, a data structure generated from RVF definition for keeping actual parameter values, including the initial input relations across calls.

During function execution, the RVF container uses several system functions and macros to manipulate the hFIC structure and perform RVF execution. For instance of multi-calls, the steps of RVF invocation include the following.

In the first call (only), initialize the hFIC to persist across calls; evaluate each relation argument expressed by a relation name or a query in terms of launching a query evaluation sub-process where the argument query is parsed, planned and executed; convert the complex DBMS internal tuple structures to an array of simple data structures to be passed in the "user-function"; initiate other arguments and possibly the scratchpad.

In every function call, including the first, set up for using the hFIC and clearing any data left over from the previous pass; get non-static input argument values; invoke user-function where the input and returned relations are array of structures defined in the corresponding header files (there is no DBMS internal call within the user-function body); convert the data generated by user-function back to DBMS internal data structures, and store them in the result-set pointed by hFE. If the return mode is TUPLE_MODE, return the first resulting tuple to the caller; otherwise if the return mode is SET_MODE, return the entire result-set.

Finally, do clean up and end the RVF execution.

Separate RVF-Shell and User-Function

Let us consider two parts of an RVF (and in general a UDF): RVF shell and user-function where an RVF shell deals with the interaction with query processing in parameter passing, data conversion, initial data preparation, memory management, etc. and the user-function contains application logic only and is plugged in the shell. Based on RVF specifications, invocation patterns and SROM, a set of high-level RVF Shell APIs are provided for building the shell; these APIs shade the DBMS internal details from RVF developers. With these mechanisms, an RVF is developed in the following two steps:

(1) provide "RVF-shell" using the high-level RVF-shell APIs, (2) Plug in the "user-function" that contains only application logic and free of DBMS internal data structures and calls.

Below we use RVF nearest_center_rvf2 given above as an example to show the function of these APIs. Given the relation definitions for Centers, Points and NearestCenters such as

```
CREATE TABLE Centers           ( CREATE TABLE Points (
  cid INTEGER NOT NULL,          pid INTEGER NOT NULL,
  x NUMERIC(10,7) NOT NULL,      x NUMERIC(10,7) NOT NULL,
  y NUMERIC (10,7) NOT NULL      y NUMERIC(10,7) NOT NULL
);                             ).
```

The typedefs like the following are generated:

```
typedef struct {              typedef struct {
  int cid; float x; float y;    int pid; float x; float y;
} Center;                     } Point;
typedef struct {              typedef struct {
  Center * centerArray;         Point * pointArray;
  int tuple_num;                int tuple_num;
} Centers;                    } Points.
```

Based on these typedefs functions like allocCenters(n), deallocCenters( ), etc., can be defined. These functions are invoked in some API functions and passed in as pointers—a coding trick allowing us to separate generic APIs and application specific functions. The hARG data structure for holding the initial arguments, nearest_center_rvf2_args, is also generated.

The RVF is constructed with TUPLE_MODE return, which computes the distances of a point to all centers and picks up the nearest center. The user-function, assign_center( ) takes x, y of a point and the array of Centers as input without DBMS system calls in the function body. These arguments are converted from/to the query processing internal objects by the appropriate Container APIs. We illustrate these APIs (upper-case with RVF_prefix) by the following pseudo RVF shell that is specific to the already registered invocation pattern and return-mode. For simplicity we omitted all exception handling and on-error early returns.

```
SQLUDR_INT32 nearest_center_rvf2(RVF_ARGS) {
  SQLUDR_INR32 rv;
  RVFCallContext *h;
  Nearest_center_rvf2_args *hARGS;
  Centers *centers;
  if (RVF_IS_FIRST_CALL( )) {
    h = RVF_FIRST_CALL_BEGIN( );
    RVF_ALLOC_ARGS(h->hARGS,
      &allocNearest_center_rvf2_args);
    h->hARGS->Centers = (Centers *)RVF_GET_INPUT_REL
      (RVF_ARG(2),&allocCenters);
    RVF_FIRST_CALL_END(h);
```

-continued

```
}
if (RVF_IS_NORMAL_CALL( )) {
  h = RVF_NORMAL_CALL_BEGIN( );
  Centers *centers = h->hARG->Centers;
  SQLUDR_FLOAT32 px = (SQLUDR_FLOAT32)
    RVF_GET_INPUT_TUPLE_FIELD(RVF_ARGS(0)),
  SQLUDR_FLOAT32 py = (SQLUDR_FLOAT32)
    RVF_GET_INPUT_TUPLE_FIELD(RVF_ARGS(1)),
  /* user-function */
  int cid = assign_center (px, py, centers);
  RVF_RETURN_NEXT(cid);
  RVF_NORMAL_CALL_END(h);
}
if (RVF_IS_LAST_CALL( )) {
  RVF_FREE (centers, &dealloccenters);
  RVF_FREE (h->hARGS,
    &deallocNearest_center_rvf2_args);
  RVF_CLOSE(h);
}
return rv;
}
```

Some of the above APIs are explained as below.
(1) API RVF_GET_INPUT_REL( ) retrieves the tuple-set of the specified relation or query result and populate the corresponding C-structure objects based on SROM.
(2) API RVF_RETURN_NEXT( ) converts a resulting tuple into the data format recognized by the query processor.
(3) API RVF_FREE de-allocates memory; using both the DBMS specific memory management utilities and those provided for the data structures used inside the user-function, with the later passed in as function pointer for keeping the generality of the API.

RVF-Shell Generation

Based on a well defined invocation pattern, exemplary embodiments single out user responsibility on DBMS independent application logic, data structures and initial data, from system's responsibility on building the RVF shell, and generate the RVF-shell automatically for relieving the analytics users from system details.

Figure 10:
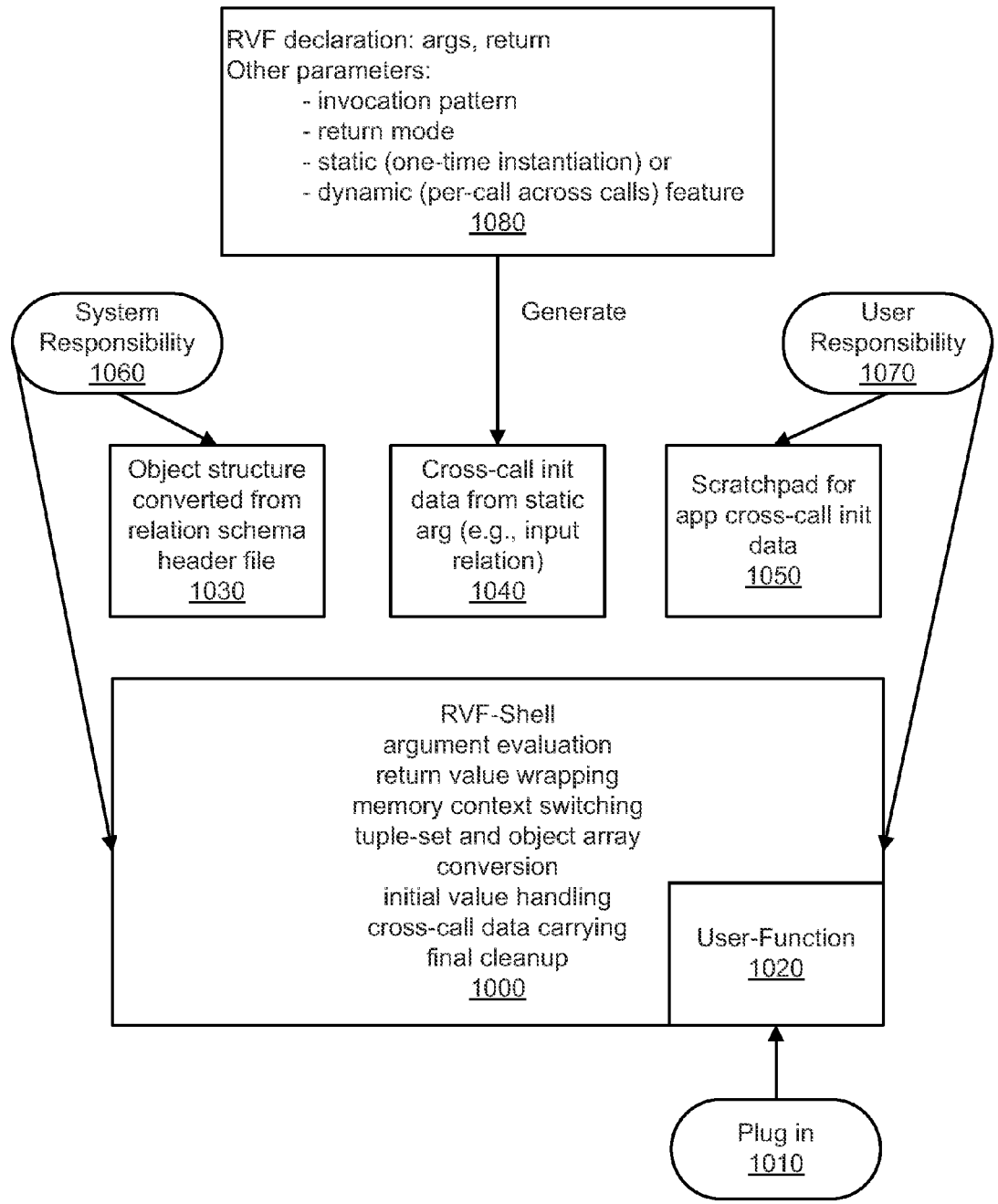
FIG. 10 shows a diagram for RVF shell generation in accordance with an exemplary embodiment.

FIG. 10 shows a diagram that generates an RVF shell. The diagram includes an RVF-shell 1000 that receives plug in 1010 to user-function 1020 and is coupled to blocks 1030, 1040, and 1050. System responsibility 1060 couples to block 1030 and the RVF-shell 1000, and user responsibility 1070 couples to block 1050 and the RVF-shell 1000. Further, RVF declarations and other parameters (shown in block 1080) generate data that couples to block 1040.

Based on the definition of an RVF stored in system meta tables, the system generates:
(1) the header file containing the RVF argument data structure declarations to be used in the "user-function";
(2) the RVF shell skeleton including FIRST_CALL, NORMAL_CALL, LAST_CALL, etc;
(3) API calls for retrieving argument relations, converting data structures; switching memory contexts, allocating and de-allocating memories, etc.

The user provides the user-function 1020 which contains only application logic but free of DBMS internal system calls and data structures. The user also deals with other optional initial data accessible to the user-function.

A complete RVF is made by plugging in the user-function 1020 into the RVF-shell 1000. For the model of FIG. 10, the responsibilities of the system and user are separated, and the system responsibility for generating the RVF shell is automated.

For example, given the declaration of the RVF for calculating nearest center, which is stored in meta-tables, the RVF is built with the following mechanisms.

A header generation utility
RVF_RO_META_GEN (rvf-name)
is responsible for generating the header files in the way described above.

A shell generation utility is responsible to generate the RVF shell in the way described above
RVF_SHELL_GEN (rvf_name).

The FIRST_CALL( ), NORMAL_CALL( ), LAST_CALL( ) in the generated RVF shell provide the following functionalities in the execution of the RVF.

In the FIRST_CALL, launching a system internal query to get the tuple-sets for Centers table in their DBMS-internal data structure; converting it to an array of C-structs defined in the generated header file, for passing in the user-function. Note that the generated code also deals with the scalar values of a tuple.

In the NORMAL_CALL, invoking the user-function; then converting the returned array of C-structs to DBMS-internal tuple-sets to be accessible by the query executor; switches memory contexts according to the specified return mode (e.g. memory context for single query, for multi-calls, etc).

In the LAST_CALL, cleanup is performed.

The RVF developer ends up with coding a function as follows:

```
struct **NearestCenters nearest_center (
    int x, int y, Centers ** centerArray).
```

The scratchpad for holding other initial data (rather than Centers) is null in this example; but in general it is an extern pointer to user defined initial values, and user has the opportunity to add any other data to be carried-on across calls.

The complete RVF is built by plugging the user-function in the shell. In this way the pure application oriented user-function is made independent of platform specific system calls, just like what featured by MapReduce platform. While the common set of invocation patterns are provided, many applications can be supported and pushed down to the DBMS layer as RVFs.

Example Embodiment

One exemplary embodiment includes a parallel database cluster with 8 server nodes and 16 disks. The RVF container capabilities are extended from the parallel query processors. We support parallelized RVF execution. The dll code and registration information of an RVF are made available, and the RVF container capabilities are supported on each node. Therefore, within a given query execution multiple instances of the function are executing concurrently across the host processes throughout the cluster.

Exemplary embodiments utilize RVF and RVF patterns as a conceptual extension to the SQL language, and a system extension to the query engine. They are supported systematically, rather than by ad-hoc UDF programs. For making UDFs practically tractable, on some systems such as SQL Server and Teradata, the input of a UDF is converted to a string from the values in the system internal formats for query processing. With such a mechanism, as reported in, no matter how simple a UDF is, it is sharply underperformed compared with a system function or expression. On the other hand, in some database systems, UDFs are coded in a same way as system functions which is efficient, but requires the UDF developer to deal with the hard-to-follow DBMS internal data structures and system calls, which significantly contracts to the easy coding of map( ) and reduce( ) functions on a MapReduce platform.

Exemplary embodiments are further characterized by one or more of the following:
(1) RVFs are used to wrap complex applications and to integrate those applications into query processing.
(2) RVF "patterns" are explicitly declared for underlying focused system support and high-level system APIs.
(3) We singled-out the analytics efforts from the system administration and programming efforts by dividing an RVF into two parts: the RVF-shell for system interaction, and the user-function for pure application logic. We automated the generation of RVF-shells and allowed the "user-function" to be plugged in the shell.

These approaches significantly enhanced the reach-ability of UDFs to large-scaled applications, the interoperability of UDF execution with query processing, and the accessibility of the UDF technology to application developers.

Figure 11:
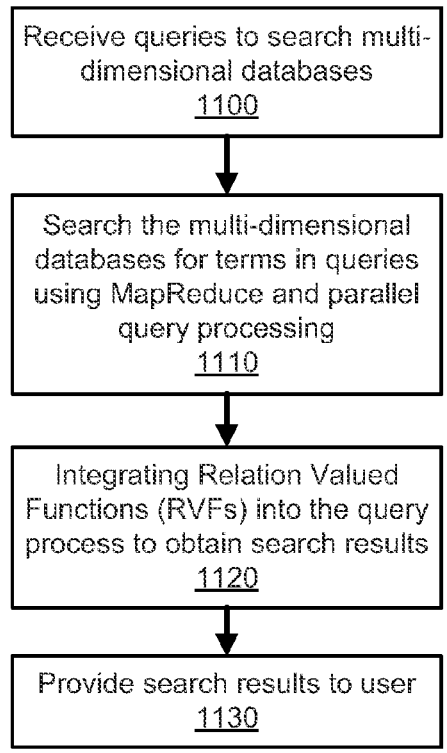
FIG. 11 is a block diagram of a method for searching a database in accordance with an exemplary embodiment.

FIG. 11 is a flow diagram for traversing a multidimensional database while searching a query in accordance with an exemplary embodiment. By way of example, the flow diagram is implemented in a data center that receives stores data in a database, receives queries from a user, and executes the queries, provides search or query results back to the user.

According to block 1100, queries are received to search multi-dimensional databases.

According to block 1110, the databases are searched for the terms or keywords in the query using MapReduce and parallel query processing among multiple computers (for example, nodes in a cluster of a distributed computing environment).

According to block 1120, Relation Valued Functions (RVFs) are integrated into the parallel query processing to obtain search results for the query.

According to block 1130, results of the query are provided to the user. For example, the results of the query are displayed to the user on a display, stored in a computer, or provided to another software application.

Figure 12:
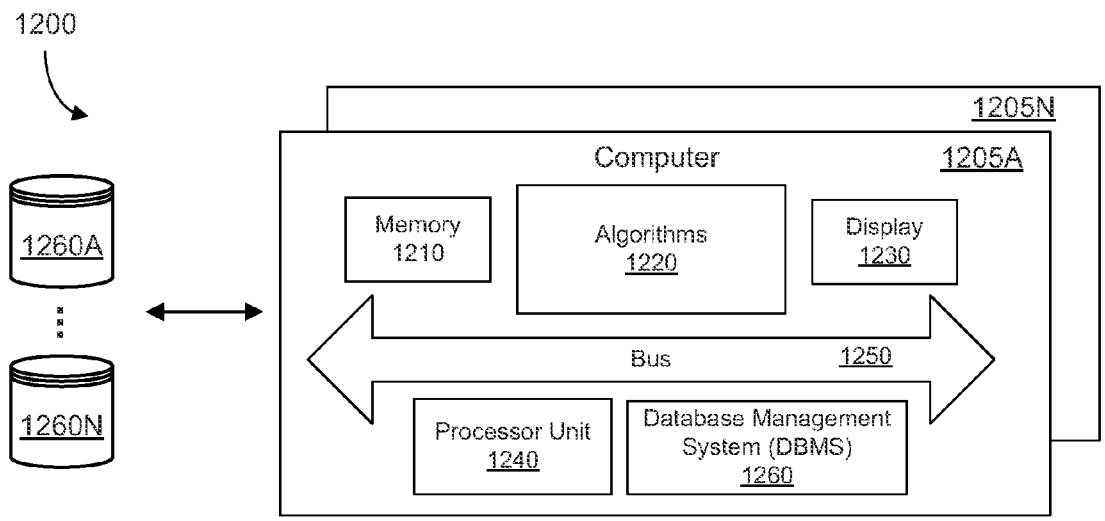
FIG. 12 is a block diagram of a computer for executing methods in accordance with an exemplary embodiment.

FIG. 12 is a block diagram of a computer system 1200 in accordance with an exemplary embodiment of the present invention. By way of example, the computer system is implemented in a data center and is a parallel database system.

In one embodiment, the computer system includes multiple databases or warehouses 1260A-1260N (such as multidimensional databases) and plural computers or electronic devices 1205A-1205N (such as computers or nodes in a cluster). By way of example, each computer includes memory 1210, algorithms 1220, display 1230, processing unit 1240, database management system (DBMS) 1260, and one or more buses 1250.

In one embodiment, the processor unit includes a processor (such as a central processing unit, CPU, microprocessor, application-specific integrated circuit (ASIC), etc.) for controlling the overall operation of memory 1210 (such as random access memory (RAM) for temporary data storage, read only memory (ROM) for permanent data storage, and firmware). The processing unit 1240 communicates with memory 1210 and algorithms 1220 via one or more buses 1250 and performs operations and tasks necessary for constructing models and searching the database per a query. The memory 1210, for example, stores applications, data, programs, algorithms (including software to implement or assist in implementing embodiments in accordance with the present invention) and other data.

DEFINITIONS

As used herein and in the claims, the following words are defined as follows:

The term "database" means records or data stored in a computer system such that a computer program or person using a query language can send and/or retrieve records and data from the database. Users pose queries to the database, and records retrieved in the answer to queries contain information that is used to make decisions.

The term "database management system" or "DBMS" is computer software designed to manage databases.

The term "MapReduce" is process that performs computations on a distributable problem using a large number of computers (nodes in a cluster). A master node receives input, divides it into smaller sub-computations, and distributes these smaller sub-computations to worker nodes (i.e., computers in a cluster). The workers nodes process the sub-computations and return answers back to the master node which, in turn, combines the answers to yield an output (for example, an answer to a computing problem involving a large data set). MapReduce provides distributed processing of the map and reduction operations by parceling out to nodes operations on a set of data. The master node schedules reduce operations on a same node or nodes in a same rack as the node storing the data to be operated on in order to conserve data exchange or bandwidth across the network. Outputs from MapReduce are stored in memory, such as stored in a distributed file system.

MapReduce is useful in a wide range of applications, including, but not limited to, distributed grep (command line text search utility), distributed sort, web link-graph reversal, term-vector per host, web access logs stats, inverted index construction, document clustering, machine learning, machine translation, and parallel database processing, to name a few examples, The term "multidimensional database" is a database wherein data is accessed or stored with more than one attribute (a composite key). Data instances are represented with a vector of values, and a collection of vectors (for example, data tuples) are a set of points in a multidimensional vector space.

The term "parallel" database system uses parallelization of operations (such as loading data, building indexes, and evaluating queries) to improve performance of database operations. Parallel databases improve processing and input/output speeds by using multiple CPUs and disks in parallel. Furthermore, parallel computer processing divides a computing problem into multiple smaller computing problems and simultaneously carries out processing of these smaller computing problems in parallel computers.

The term "Relation Valued Functions" or "RVF" is a special kind of UDF that wraps application functions with relational signatures. The RVF has an input as a list of relations and returns a value as a relation. Besides the possible database update effects coded in the function body, an RVF maps the input relation(s) to the returned relation like a relational operator and thus can be composed with other relational operators in a SQL query.

The term "Structured Query Language" or "SQL" is a database computer language that retrieves and manages data in a relational database management systems (RDBMS), database schema creation and modification, and database object access control management. SQL provides a language for an administrator or computer to query and modifying data stored in a database.

The term "User Defined Functions" or "UDF" is a function in a program that provides a mechanism for extending the functionality of a database server by adding a function that can be evaluated in SQL statements.

In one exemplary embodiment, one or more blocks or steps discussed herein are automated. In other words, apparatus, systems, and methods occur automatically. The terms "automated" or "automatically" (and like variations thereof mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term physical or tangible storage media of some type, such as a CD-ROM drive or hard drive. The software programming code is embodied or stored on any of a variety of known physical or tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer implemented method, comprising:
   receiving, at a computer, a query to search, a database;
   using MapReduce and parallel query processing among multiple computers to search the database;
   modeling applications defined on a set of tuples by integrating Relation Valued Functions (RVFs) into the parallel query, processing to search the database and obtain search results;
   classifying invocations of the RVFs to designated patterns for focused and pattern-specific system support for interacting executions of the RVFs with query processing; and
   separating the RVFs imo an RVF shell that deals with system interactions and user functions that are input into the RVF-shell, wherein the RVF shell handles interaction with query processing in parameter passing, data conversion, initial data preparation, and memory management, and the user-functions handle application logic only;
   outputting the search results.

2. The method of claim 1 further comprising, separating the RVFs into an RVF-shell that is automatically constructed in terms of Application Program Interfaces (APIs).

3. The method of claim 1 further comprising, using the RVFs to support the MapReduce inside a parallel database engine.

4. The method of claim 1 further comprising, supporting the RVFs at a Structured Query Language (SQL) level by configuring both map and reduce functions to receive tuple-set arguments and to return a triple-set in order to serve as a relational data source in the parallel query processing.

5. The method of claim 1 further comprising, interacting the RVFs with a query executor to resolve arguments, cache initial data to be used in multiple calls, and manage memory life span.

6. The method of claim 1 further comprising, declaring RVF patterns for focused system support, wherein the RVF patterns represent a specific style for applying the RVFs to input relations that include one tuple at a time, an entire relation, and multiple input relations.

7. The method of claim 1 further comprising, using the RVFs for wrapping applications and for integrating the applications into query processing.

8. A tangible computer readable storage medium having instructions for causing a computer to execute a method, comprising receiving, at a computer, a query to search a database;
   modeling applications defined on a set of tuples by invoking a Relation Valued Function (RVF) into the query;
   divide the RVF into (1) an RVF-shell that deals with interaction with query processing in parameter passing, data conversion, initial data preparation, and memory management, and (2) a user function that deals with application logic; and
   wherein the RVF shell is generated from declarations and argument relation schemas;
   classifying invocations of the RVVs to designated patterns for focused and pattern-specific system support for interacting executions of the RVFs with query processing; and
   using MapReduce to process the query among multiple computers, search the database, and generate search results for the query.

9. The tangible computer readable storage medium of claim 8, wherein the computer further executes the method to call the RVF once to return an entire tuple-set.

10. The tangible computer readable storage medium of claim 8, wherein the computer further executes the method to support analytics computation modes inside a parallel database engine.

11. The tangible computer readable storage medium of claim 8 wherein the computer further declares RVF patterns for underlying focused system support and high-level system Application Program Interfaces, wherein RVF patterns are a generalization of limited forms of declarations on user-defined aggregate functions.

* * * * *

UNITED STATES PATENT AND TRADEMARK OFFICE
CERTIFICATE OF CORRECTION

| | | |
|---|---|---|
| PATENT NO. | : 9,268,815 B2 | Page 1 of 1 |
| APPLICATION NO. | : 12/544227 | |
| DATED | : February 23, 2016 | |
| INVENTOR(S) | : Qiming Chen et al. | |

It is certified that error appears in the above-identified patent and that said Letters Patent is hereby corrected as shown below:

In the claims

In column 16, line 18 approx., in Claim 4, delete "triple" and insert -- tuple --, therefor.

In column 16, line 46 approx., in Claim 8, delete "RVVs" and insert -- RVFs --, therefor.

Signed and Sealed this
Twenty-fourth Day of May, 2016

Michelle K. Lee
*Director of the United States Patent and Trademark Office*